(12) United States Patent
Shimizu

(10) Patent No.: US 11,203,158 B2
(45) Date of Patent: Dec. 21, 2021

(54) STEREOLITHOGRAPHY APPARATUS AND STEREOLITHOGRAPHY METHOD

(71) Applicant: KABUSHIKI KAISHA TOSHIBA, Minato-ku (JP)

(72) Inventor: Akihisa Shimizu, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 558 days.

(21) Appl. No.: 15/690,629

(22) Filed: Aug. 30, 2017

(65) Prior Publication Data

US 2018/0243993 A1   Aug. 30, 2018

(30) Foreign Application Priority Data

Feb. 24, 2017   (JP) .............................. JP2017-033634

(51) Int. Cl.

| | | |
|---|---|---|
| *B29C 64/393* | (2017.01) | |
| *B29C 64/135* | (2017.01) | |
| *B33Y 30/00* | (2015.01) | |
| *B33Y 50/02* | (2015.01) | |
| *B33Y 10/00* | (2015.01) | |

(52) U.S. Cl.
CPC .......... *B29C 64/393* (2017.08); *B29C 64/135* (2017.08); *B33Y 30/00* (2014.12); *B33Y 50/02* (2014.12); *B33Y 10/00* (2014.12)

(58) Field of Classification Search
None
See application file for complete search history.

(56) References Cited

U.S. PATENT DOCUMENTS

| | | | | |
|---|---|---|---|---|
| 4,766,556 | A | * | 8/1988 | Arakawa ................. G06T 15/40 345/419 |
| 6,098,025 | A | * | 8/2000 | Bae ........................ G01M 1/122 702/94 |
| 6,405,095 | B1 | * | 6/2002 | Jang .................... G05B 19/4099 700/118 |
| 9,280,616 | B2 | | 3/2016 | Cudak et al. |
| 2013/0053995 | A1 | | 2/2013 | Hashimoto et al. |
| 2015/0294030 | A1 | | 10/2015 | Cudak et al. |

FOREIGN PATENT DOCUMENTS

| | | |
|---|---|---|
| JP | 2013-043409 | 3/2013 |
| JP | 2013-086289 | 5/2013 |
| JP | 2015-231711 | 12/2015 |

\* cited by examiner

*Primary Examiner* — Monica A Huson
*Assistant Examiner* — Kelsey C Grace
(74) *Attorney, Agent, or Firm* — Oblon, McClelland, Maier & Neustadt, L.L.P.

(57) ABSTRACT

According to one embodiment, of the present disclosure, a stereolithography apparatus is a 3D printer of various kinds used to form a solid object (a mockup of a tennis racket or a golf club) on the basis of original design data (CAD data). In this apparatus, markers (MKa, or MKb1 to MKb4) corresponding to one or more sinkers are disposed at one or more positions of an object formed to be lighter than a design weight of the solid object formed on the basis of the original design data. In the structure, one or more sinkers having a certain weight, size, and shape, are disposed in one or more marker positions of the object.

9 Claims, 10 Drawing Sheets

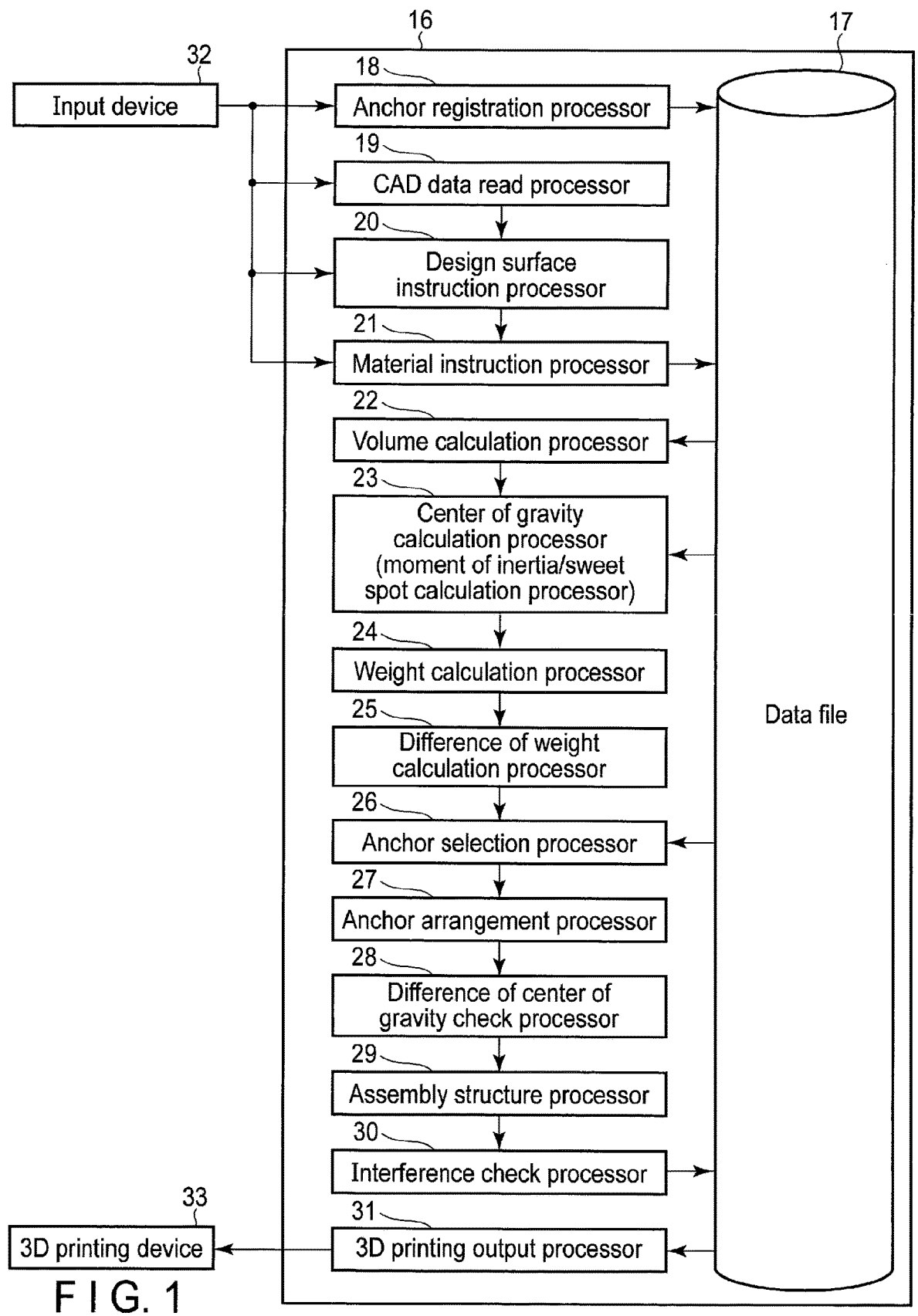
F I G. 1

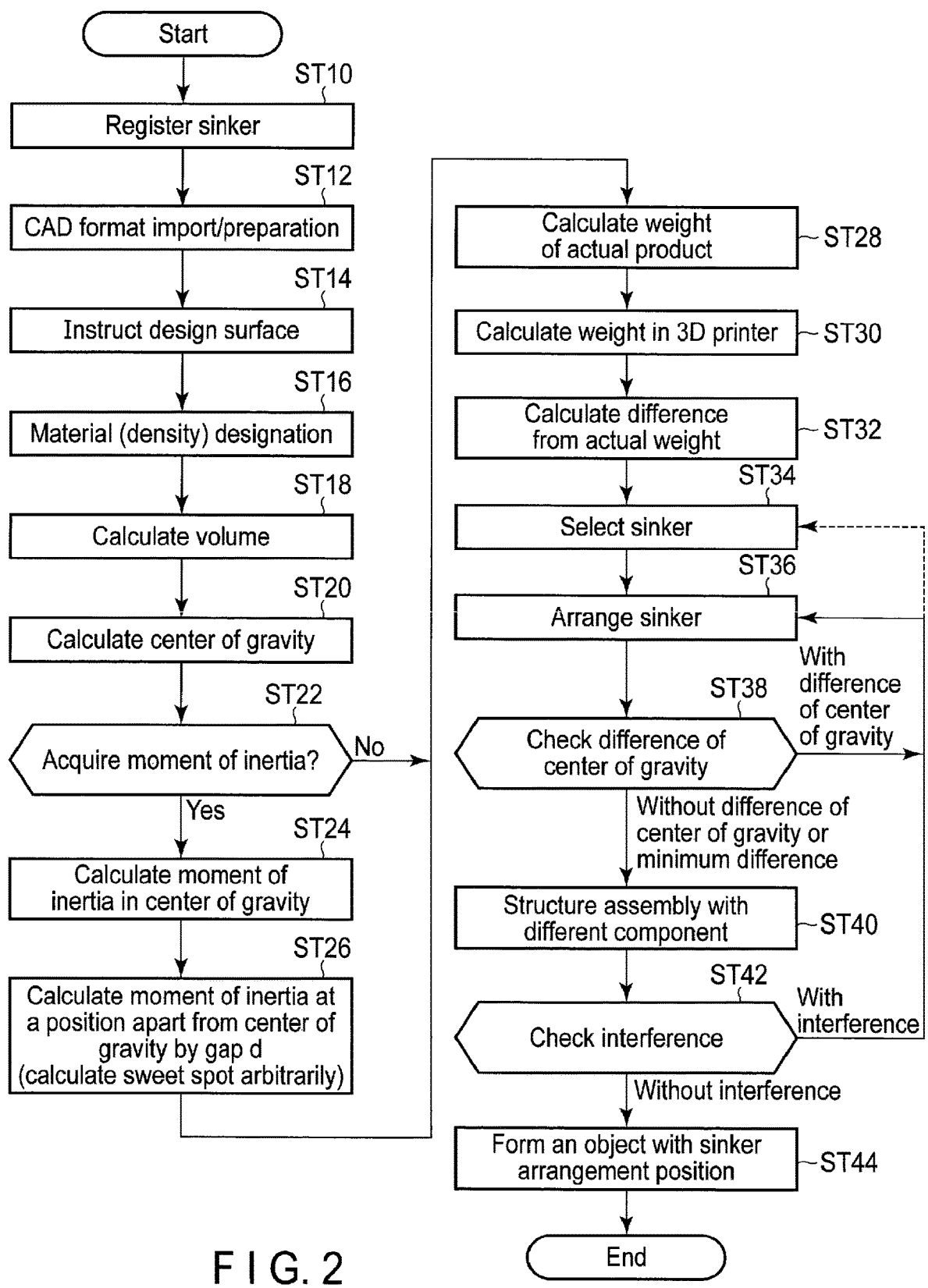
F I G. 2

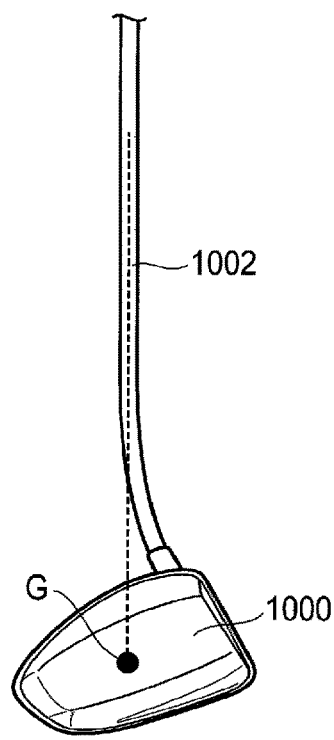
F I G. 13
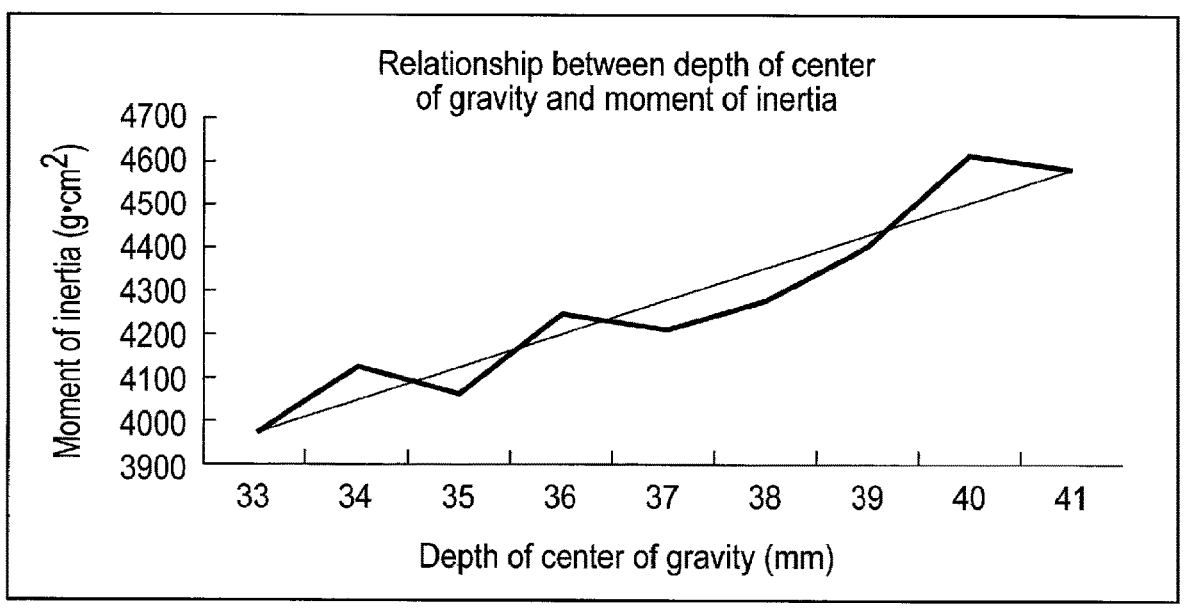
F I G. 14

STEREOLITHOGRAPHY APPARATUS AND STEREOLITHOGRAPHY METHOD

CROSS-REFERENCE TO RELATED APPLICATIONS

This application is based upon and Claim the benefit of priority from Japanese Patent Application No. 2017-033634, filed Feb. 24, 2017, the entire contents of which are incorporated herein by reference.

FIELD

Embodiments described herein relate generally to a stereolithography apparatus (three dimensional object forming device, three dimensional printing device, or 3D printer) and a stereolithography method.

BACKGROUND

Conventional stereolithography apparatuses such as 3D printers can accurately reproduce the shape of a solid object (3D printed object) while the weight thereof differs on the basis of the material used (a resin or a metal, for example).

Stereolithography apparatuses such as 3D printers have been developed. 3D printers can accurately reproduce the shape of a solid object (3D printed object).

However, when a mockup (solid object/3D printed object) is output in order to check the shape during a design process of a product, the weight and the center of gravity of the mockup may differ from those of an actual product. In that case, the weight of the product and the balance thereof are difficult to consider in the design process.

In consideration of this point, designers and testers may produce a mockup (solid object/3D printed object), and then adjust the weight and balance thereof. However, when the weight and balance of the mockup are adjusted in a follow-up process, the design of the product may not be maintained, and the exterior image of the product may change. Such a change in the exterior image is inconvenient for products design of which is important.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an example of the structure of a system of a stereolithography apparatus (3D printer) to which an embodiment is applied.

FIG. 2 is a flowchart of an example of data processing in the stereolithography apparatus (3D printer) of FIG. 1.

FIG. 13 shows a mockup in which the driver head of FIG. 12 is attached to a swing shaft.

FIG. 14 shows a relationship between a depth of center of gravity and a moment of inertia in the mockup (a golf driver) to be formed.

DETAILED DESCRIPTION

Figure 3:
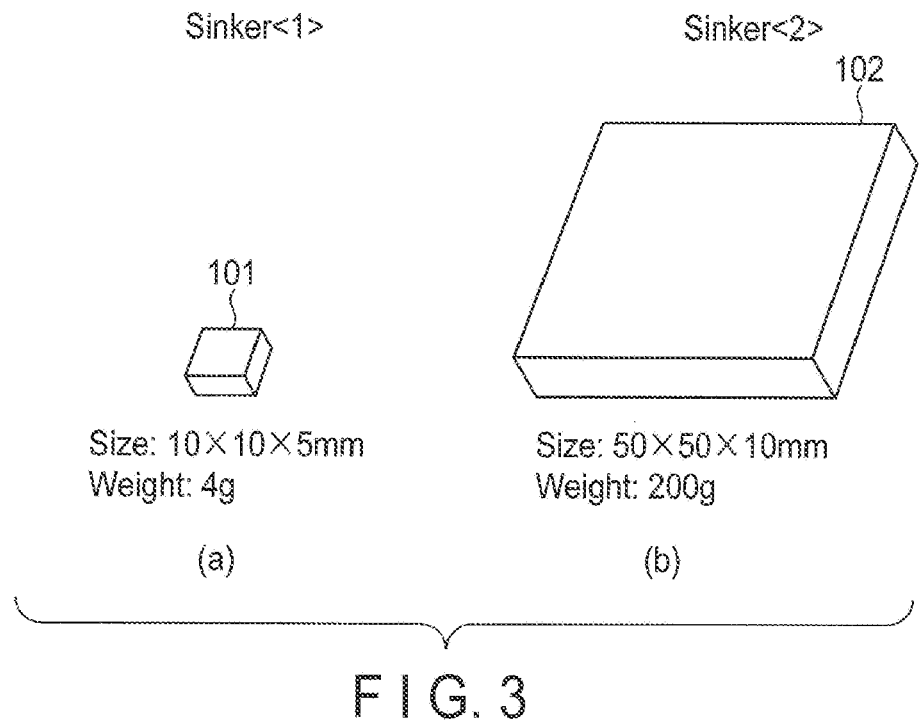
FIG. 3 shows sinkers of several kinds used in a solid object formed by the stereolithography apparatus (3D printer) of FIG. 1.

Various embodiments will be described hereinafter with reference to the accompanying drawings.

In general, according to one embodiment, a stereolithography apparatus and a stereolithography method can facilitate adjustment (or change) of the weight, center of gravity, and the like of a solid object (such as a mockup) without affecting the design thereof even after a stereolithography process (3D printing) is finished.

According to an embodiment, a typical example of a stereolithography apparatus is a 3D printer of various kinds which forms a solid object on the basis of original design data (CAD data).

In this apparatus, one or more markers corresponding to one or more sinkers are disposed in one or more positions of an object which is formed lighter than a design weight of a solid object indicated by the original design data. In the positions of the marker (or markers), one or more sinkers having a particular weight, shape, and size are disposed.

Specifically, the stereolithography apparatus of the embodiment can attach one or more sinkers of various kinds to a mockup (solid object formed by 3D printing) avoiding its design surfaces (in a movable and detachable manner) in order to prevent, for example, a difference between the weight of the mockup and an actual product (an article corresponding to the mockup). The attachment (adhesion, engagement, etc.) of one or more sinkers can be arbitrarily performed at the positions of the markers even after the 3D printing process proceeds to some extent (or is completely finished).

Here, the position of marker and the shape and size of sinker will be selected such that, when structural components are combined to form a mockup, the sinker in the position of marker does not interfere (hit) a part of the structural components of the mockup or does not affect the exterior (design) of the mockup. The selection can be performed in stereolithography data (CAD data of STL file format or the like). One or more sinkers (all or a part of one or more sinkers) attached to the position of marker can be increased/decreased or changed.

An embodiment will further be described with reference to the drawings.

FIG. 1 shows an example of the structure of a system of a stereolithography apparatus (3D printer) to which an embodiment is applied. The system may specifically be referred to as a mockup weight automatic adjustment system. The system includes an input device 32, system main body 16, and output device 33.

Although this is not shown, the input device 32 includes a high resolution display, user operated input part (keyboard, mouse, stylus, touchpanel, etc.), external device reader (USB terminal, memory card reader, optical disk drive), and LAN connector (Ethernet (registered trademark), etc.).

The output device 33 can be formed of a 3D printer of various kinds. As conventional types of a 3D printer, there are, for example, a fused deposition molding (FDM) type, stereolithograhy (STL) type, selective laser sintering (SLS) type, inkjet type, projection type, and inkjet granite layering type.

A fused deposition molding (FDM) type is a 3D printer which laminates layers of a thermal fusible resin (ABS resin or the like) one by one. A stereolithography (STL) type is a 3D printer which irradiates ultraviolet laser to a chamber filled with a optically cured resin to form layers one after another and laminates the layers altogether to form an object. A selective laser sintering (SLS) type is a 3D printer which irradiates high power laser to a granite material (a resin material such as nylon or a metal material such as copper, bronze, titanium, or nickel) for sintering and forming an object. An inkjet type is a 3D printer which ejects liquefied ultraviolet cured resin and irradiates ultraviolet thereto for curing, and layers the cured resin to form an object. A projection type is a kind of lithography type and is a 3D printer which cures a resin using light from a projector and layers the cured resin to form an object. An inkjet granite layering type is a 3D printer which add granite such as starch or gypsum to a resin and cures the granite and resin to form layers. The inkjet granite layering type may be referred to as granite fixation layering type.

As data file formats of a 3D printer, there are FDM, STL, and SLS, for example, and the formats can arbitrarily be selected to conform to the type of 3D printer used. If a data file format is different from a file format of 3D printer used, file conversion may be performed. For example, an FDM file of a mockup may be converted into an STL file and 3D printing (stereolithography) of the mockup can be performed by a stereolithography (STL) 3D printer.

The system main body 16 includes a data file 17, sinker registration processor 18, CAD data read processor 19, design surface instruction processor 20, material instruction processor 21, volume calculation processor 22, center of gravity calculation processor 23, weight calculation processor 24, weight difference calculation processor 25, sinker selection processor 26, sinker arrangement processor 27, center of gravity check processor 28, assembly structure processor 29, interference check processor 30, and stereolithographic shape output processor 31. Note that the center of gravity calculation processor 23 can include a moment of inertia calculation processor and a sweet spot calculation processor.

The system of FIG. 1 can be structured with a computer which executes software performing processes of FIG. 2. FIG. 2 is a flowchart of an example of data processing in the stereolithography apparatus (3D printer) of FIG. 1.

Initially, a user registers sinkers having various weights, shapes, and sizes one or more (ST10). The registration is performed to a data file 17 of FIG. 1 (and/or to an external server which is not shown). Simple examples of the sinkers registered in the data file 17 are shown in FIG. 3. FIG. 3(a) shows a sinker <1> which is 4 g in weight, and a thin plate-like cuboid of 10×10×5 mm. FIG. 3(b) shows a sinker <2> which is 200 g in weight, and a thick plate-like cuboid of 50×50×10 mm. When a specific gravity of a sinker (density of a material) is changed, same-sized sinkers of different weights can be prepared (for example, if a metal sinker of specific gravity 8 is changed to a resin sinker of specific gravity 1, a same-sized sinker having 1/8 weight can be prepared).

The weight, shape, and size of each sinker is not limited to the examples of FIG. 3, and various weights, shapes, and sizes can be adopted. For example, the weight can be changed between 0.1 and 1 g by 0.1 g unit, between 1 and 10 g by 1 g unit, between 10 and 100 g by 10 g unit, between 100 and 1000 g by 100 g unit, and between 1 and 10 kg by 1 kg unit. Although this is not shown, the shape of sinker is optional, and in addition to a cube and a cuboid, the shape may be polygonal, polyhedron, pyramid, cylindrical, sphere, cone, football-like, ring, tetrapod, star, or the like. The size may be a sphere of 1 mm diameter or a cube of 1 mm edge lengths (or a cuboid of 1 mm edge lengths and 100µ thickness) at the minimum, or may be a sphere of 100 mm diameter or more or a cuboid of 100 mm edge lengths or more (or a flexible rod or string having a length relatively greater than its cross-sectional size) at maximum.

Then, CAD data showing a stereolithographic shape of a mockup to be formed are imported in the system by the CAD data read processor 19, or desired CAD data are prepared by a used with keyboards and mouse operation, for example (ST12). The CAD data may be extracted from a server or an external memory by a user, and adjusted by the user for the purpose. If the CAD data are a part of an assembly including a plurality of components, the entire CAD data of the assembly are read.

Figure 4:
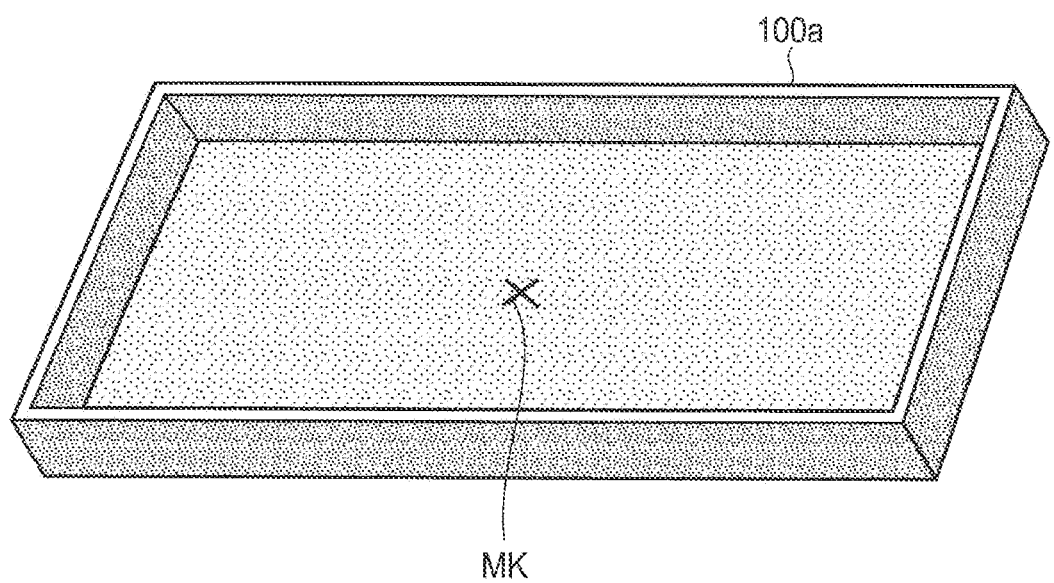
FIG. 4 shows a simple example of CAD data used to form a mockup by the stereolithography apparatus (3D printer).

FIG. 4 shows a simple example of a mockup corresponding to the CAD data. If the mockup is a thin box-like pair of upper and lower assemblies (for example, outer shell assemblies of a clamshell PC including a main body part and a lid part), FIG. 4 shows one of the box-like assembly (lower assembly) 100a. Here, an exterior of the mockup (design) is not instructed.

Figure 5:
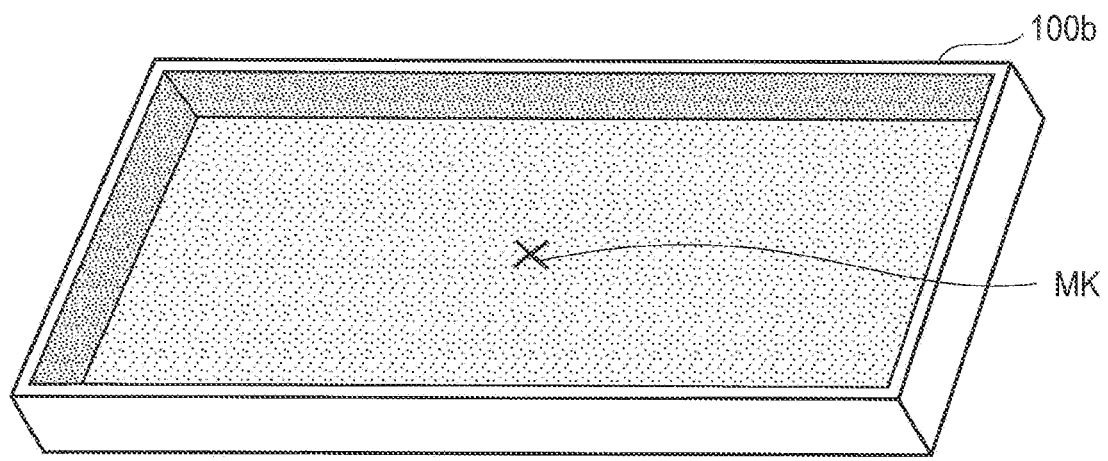
FIG. 5 shows an example of a case where a particular design surface is selected in the CAD data of FIG. 4.

Then, the user uses the input device 32 to instruct a design surface where a sinker is not disposed after a mockup is formed (ST14). FIG. 5 shows the lower assembly 100b when a design surface of the mockup is instructed by the CAD data of FIG. 4. Here, the design surface of the mockup (outer surface) is shown in white.

Then, the user designates a material used in an actual product and a material of the mockup used in the stereolithography apparatus (ST16). If a specific material (such as an ABS resin) is designated, a specific gravity or a density may be determined automatically. For example, if a highly shock resistive ABS resin is designated as a specific material, a specific gravity or a density (g/cm$^3$) is automatically selected between 1.01 and 1.04. If a fire resistive ABS resin is designated as a specific material, a specific gravity or a density (g/cm$^3$) is automatically selected between 1.16 and 1.21, and if a glass fibre ABS resin is designated as a specific material, a specific gravity or a density (g/cm³) is automatically selected between 1.23 and 1.36. Values of a specific gravity and a density are merely examples and the embodiment is not limited to the above values.

After the material (specific gravity or density) is designated, the whole volume of the mockup is calculated from the shape and size derived from the CAD data (ST18). Then, from the shape and size derived from the CAD data, calculated volume, and specific gravity and density of the designated material, the center of gravity of the mockup to be formed is calculated (ST20). Refer to a textbook of physics for a calculation method of center of gravity.

After the position of center of gravity is calculated, data indicative of position and/or range of formation of a marker are added to the CAD data to print the marker (MK in FIGS. 4 and 5) in the position of center of gravity. The marker may be a figure such as ⊚ or ◇, or a character such as MK. Or a concave shaped as □, ○, ∆, or ☆ in which a sinker to be used can be fit may be used as a marker.

Then, whether or not a moment of inertia of the mockup is derived is determined (ST22). If the mockup is formed as an article which is not moved substantially in it use such as a clamshell PC, only the whole weight and the center of gravity may be calculated. In that case, a calculation process of moment of inertia is skipped (No in ST22).

On the other hand, if the mockup is formed as a mobile article moved significantly in its use such as a tennis racket, baseball bat, or golf club, calculation of only the whole weight and the center of gravity may not be sufficient. In that case, the moment of inertia is calculated (Yes in ST22).

For example, if a mockup of a baseball bat (refer to FIG. 10) is formed, the whole weight (whole mass) M is derived from the density of the material (ST16) and the whole volume (ST18), and moment of inertia IG around the center of gravity G is derived (ST24). Then, a virtual revolution center of a batter who grips and swings the bat is determined provisionally from average data of multiple samples. Then, from a geometrically positional relationship between a virtual revolution center position (not shown) and a gap a between grip center Q and center of gravity G, a distance d from center of gravity G to the virtual revolution center can be determined temporarily. If an axis passing the virtual rotation center and an axis passing center of gravity G are, provisionally, parallel, square of distance d is multiplied by the whole weight M and added to moment of inertia IG around center of gravity G (cf. parallel axis theorem), moment of inertia Io (=IG+Md²) related to a touch felt by a batter swinging the bat (ST26). Since moment of inertia Io is calculated on the basis of provisional data (virtual revolution center), the absolute value thereof is not highly reliable. However, moment of inertial Io of the mockup and moment of inertia Io of the actual product are calculated under the same conditions, the mockup consideration with feeling closer to the use condition of the actual product can be performed.

Figure 10:
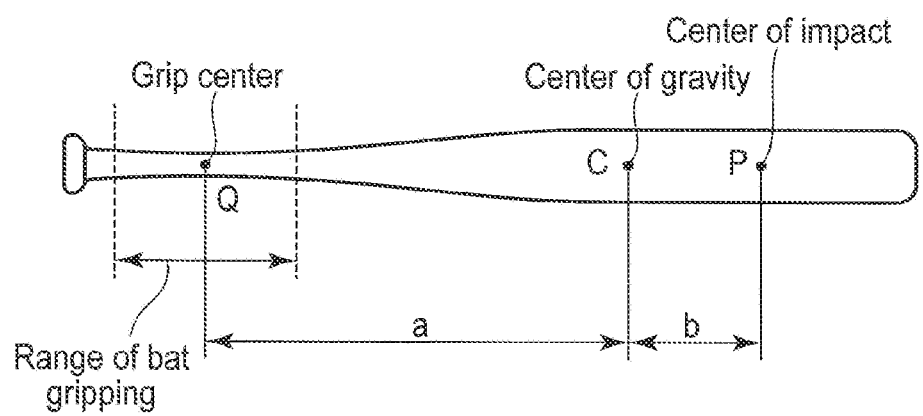
FIG. 10 shows a center of gravity and a sweet spot (point of impact) of a mockup (baseball bat) to be formed.

Note that, not only moment of inertia Io, but also point of impact (sweet spot) P apart from center of gravity by distance b can be added to the consideration items of the mockup (refer to FIG. 10). That is, in addition to the position of center of gravity G of the mockup, if one or more sinkers are disposed corresponding to a position of a sweet spot P are disposed in a non-design surface of the mockup (inside the bat) as in the actual product, the mockup consideration can be more accurately. Here, the arrangement of one or more sinkers can be recognized immediately by the markers formed in the non-design surface of the mockup (inner space of the mockup bat which cannot be seen from the outside).

If the position where the sinker is attached is a space with a lid to accommodate a sinker, increase/decrease (replace) of the sinker is easily performable after the formation of the mockup. After the sinker is replaced arbitrarily, a lid (a lid surface of which is finished not to affect the design) is closed and the design of the mockup is not affected by the sinker.

If the calculation process of moment of inertia is skipped (No in ST22), or the calculation process of moment of inertia is finished (Yes in ST22, ST24, and ST26), an actual weight of the actual product is calculated on the basis of the CAD data (ST28). Furthermore, the weight of the mockup formed by a 3D printer with a designated material is calculated (ST30), a difference between the actual weight of the actual product and the weight of the mockup is calculated (ST32). From this calculated, one or more sinkers necessary can be selected. For example, the actual product weighs 1200 g and the mockup weighs 1000 g, one sinker 102 of 200 g can be selected (ST34). The selected sinker 102 is disposed in the position of marker MK in the mockup (refer to FIGS. 4 to 6).

If a difference of center of gravity becomes greater than a preset value by the arrangement of sinker 102 (with difference of center of gravity in ST38), the position of sinker 102 is changed (a different correction marker MK can be added later). If a difference of center of gravity becomes less than a preset value, (without or with minimum difference of center of gravity in ST38), the position of marker MK is maintained.

Figure 6:
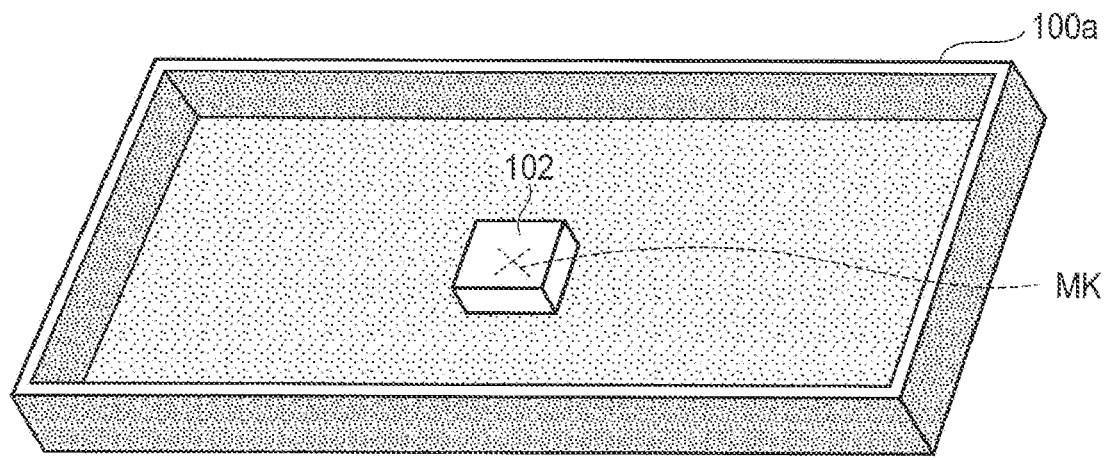
FIG. 6 shows an example of a case where a particular sinker is disposed in the CAD data of FIG. 4.
Figure 7:
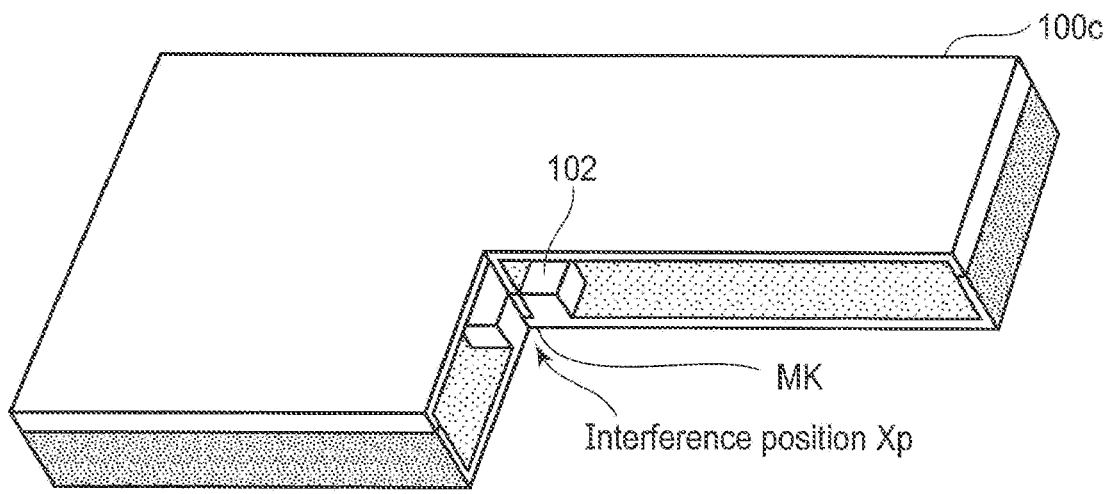
FIG. 7 shows an example of a case where the sinker interferes a part of a mockup formed on the basis of CAD data in the example of FIG. 6.

Then, a different component of the mockup is formed for assembly (ST40). If the mockup includes a pair of thin box-like components, FIG. 6 shows one of the pair of box-like components (lower assembly) 100a and FIG. 7 shows the other of the pair of box-like components (upper assembly) 100c. The lower assembly 100a is a component of the mockup while the upper assembly 100c is the other component of the mockup, the component 100a and the component 100c are assembled (ST40).

While the components are assembled, if the sinker 102 disposed in the position of the marker MK interferes the component 100c (ST42). In the example of FIG. 7, inner rib of the component 100c hits the sinker 102 at an interference position Xp. In that case, the condition is with interference and the arrangement of the sinker is shifted (ST36). In the condition of with interference, the step returns to sinker selection (ST34) if necessary, the sinker is changed to two sinkers of 100 g which can be dispersed at right and left positions of the inner rib of the component 100c.

After interference is removed, the CAD data are rewritten such that the marker MK for the arrangement of sinker is formed at position without interference, and a data file containing data necessary for stereolithography is sent to 3D printer (ST44). Here, if two small sinkers are dispersed in positions without interference, markers MK1 and MK2 are formed in the dispersed positions.

In the above example, the lower assembly 100a (or 100b) and the upper assembly 100c are detachable after the mockup is formed. Thus, the adjustment (change) of the sinker is required after the formation of the mockup, the upper assembly 100c is detached and one or more sinkers in the position of the marker MK are partly or wholly replaceable. Since the marker is disposed, the user does not confuse the original position of the sinker in the replacement. After the sinker is replaced, the upper assembly 100c and the lower assembly 100a (or 100b) are combined. Thereby, adjustment (or change) of the weight and center of gravity of the mockup can easily be performed without affecting the design of the mockup.

Figure 8:
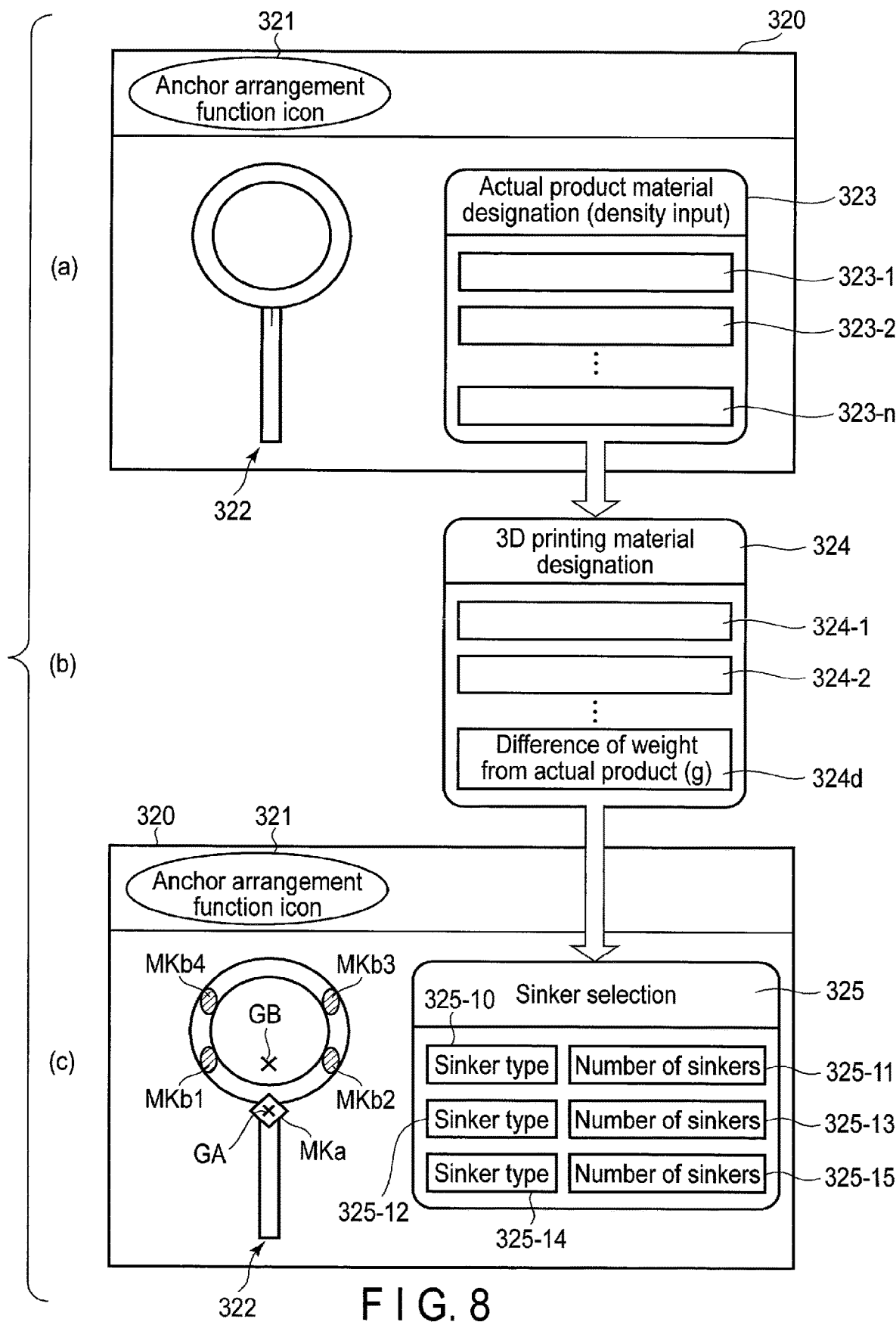
FIG. 8 shows an example of user interface used when data related to a mockup (for example, a tennis racket) to be formed are input to the stereolithography apparatus (3D printer) of FIG. 1.

FIG. 8 shows an example of user interface used when data related to a mockup (for example, a tennis racket) to be formed are input to the stereolithography apparatus (3D printer) of FIG. 1. The interface can be displayed on a display device (which is not shown) of the input device 32 of FIG. 1.

In the upper part of a display screen 320 of FIG. 8(*a*), an icon (sinker arrangement function icon) 321 corresponding to a user operation to be performed currently is actively displayed. In the left of the screen, a simply 3D image 322 of a mockup (tennis racket) to be formed is displayed. In the right of the screen, a window 323 including input frames 323-1, 323-2, . . . 323-*n* in which density of a material designated for each structural component (frame, grip, gut, etc.) of the product (tennis racket) is input. If a material is specified, a density thereof can be set in default.

If a user presses an enter key of a keyboard (which is not shown) after the designation of material (and density) of the actual product, the right of the screen switches to the designation window 324 of 3D printing material (material of mockup). The window 324 includes input frames 324-1, 324-2, . . . in which a material designated for each structural component (frame, grip, gut, etc.) of the mockup. If a material is specified, a density thereof can be set in default.

From the CAD data, the volume of each structural component of the actual product and the mockup can be derived. Thus, when the materials of the actual product and the 3D printing materials are all input and the density of each material is determined, the weight of the actual product and the weight of mockup can be derived. Then, a difference of weight between the actual product and the mockup is calculated and the difference of weight 324*d* is displayed in the lowest part of the window 324. If the mockup is heavier than the actual product, the difference of weight 324*d* is displayed in a negative value. In that case, in a 3D printing material instruction window 324, the materials of the structural components of the mockup are partly or wholly changed to materials of less density until the difference of weight 324*d* becomes a positive value. Thus, the total weight of the sinker applied to the mockup can be derived from the value of the difference of weight 324*d*.

If the value of the difference of weight 324*d* is determined proper by the user, the user presses the enter key (which is not shown) of the keyboard. Then, the right of the screen switches to a sinker selection window 325 as in FIG. 8(*c*). Furthermore, a mockup image 322 in the left of the screen includes an X mark which corresponds to the position of center of gravity (GA or GB) of the mockup (tennis racket) calculated on the basis of the CAD data.

If the position of center of gravity GA displayed is within the structure of the mockup, one sinker corresponding to the difference of weight 324*d* is prepared. In that case, the sinker with a shape and a size which do not affect the design of the mockup when being attached to the marker MKa on the position of center of gravity GA of the mockup is selected from a list of a large number of sinkers (which is not shown) registered in the data file 17. An identification code of the selected sinker is input in a sinker type input frame 325-10, and the number of sinkers which is one is input in a sinker number input frame 325-11, what sinker is used, how many sinkers are required, and where in the mockup (the position of marker MKa) the sinker is attached can be all determined. After the attachment of the sinker, a lid surface of which conforms to the exterior of the mockup is fit to substantially prevent the sinker from affecting the design of the mockup.

On the other hand, if the position of center of gravity GB displayed is out of the structure of the mockup (in a space), the sinker cannot be attached to the position of space (GB). In that case, a plurality of sinkers are disposed in a plurality of positions in the structure of the mockup surrounding the position of center of gravity GB (in the example of FIG. 8(*c*), four positions of the markers MKb1 to MKb4). The total weight of the sinkers corresponds to the value of the difference of weight 324*d*. The positions where the four sinkers are disposed (markers MKb1 to MKb4) are limited inside the structure of the mockup, and the positions are determined such that the center of gravity of the mockup containing the four sinkers can come as close as possible to the position GB. To determine the positions, a mockup may be formed first, and then the positions of sinkers on the mockup may be changed for several times to find the right positions.

When the positions of markers MKb1 to MKb4 corresponding to four sinkers are determined, the types and numbers of the sinkers to be disposed therein. AN identification code indicative of a type of each sinker is input in sinker type input frames 325-10, 325-12, 325-14, . . . in the sinker selection window 325, and the number of sinkers is input in number input frames 325-11, 325-13, 325-15 . . . in the sinker selection window 325. Thus, even if the positon of center of gravity is within a space where no sinker is allowed, the center of gravity of the mockup can be performed. Furthermore, after the attachment of the sinker, a lid surface of which conforms to the exterior of the mockup is fit to substantially prevent the sinker from affecting the design of the mockup.

Figure 9:
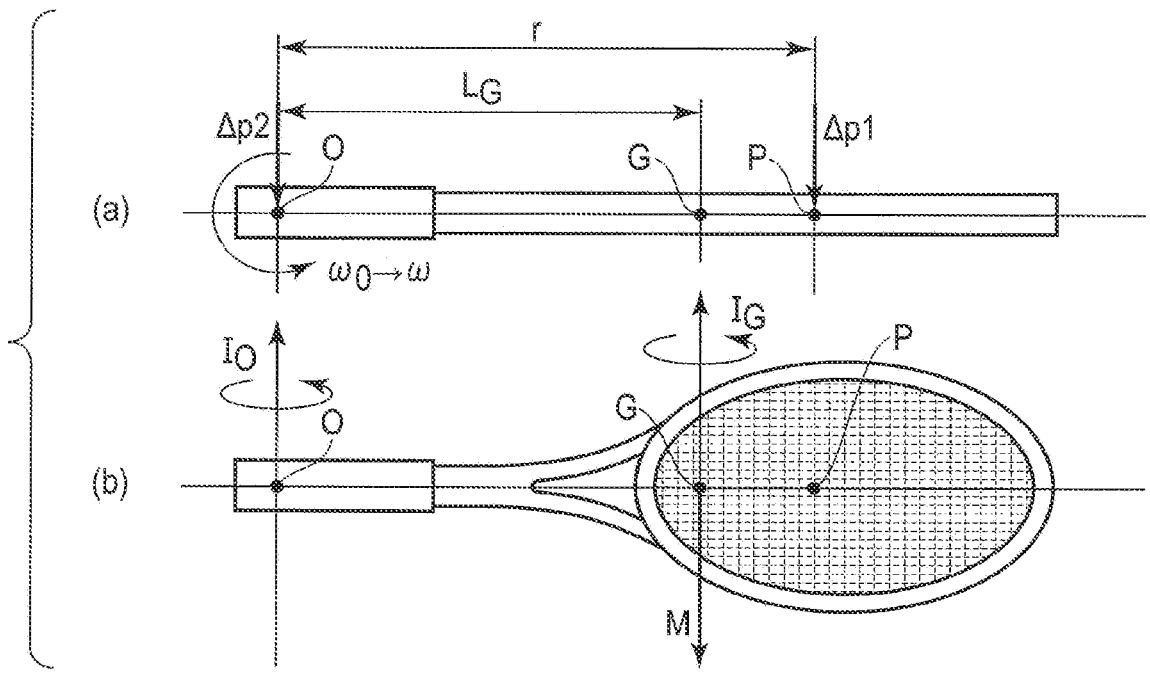
FIG. 9 shows a center of gravity, moment of inertia, and sweet spot of the mockup (tennis racket) to be formed.

FIG. 9 shows a center of gravity, moment of inertia, and sweet spot of the mockup (tennis racket) to be formed. Here, a mass of the tennis racket in the figure is given M, a gap between a revolution center Q and a center of gravity of racket G is given LG, and a moment of inertia around an axis passing the center of gravity G in parallel to a face (surface to which a gut is applied) is given IG.

Now, the racket is swung where an axis in parallel to the face of racket and passing the center (Q) of the hold part of the grip is a revolution center and an angular velocity is $\omega o$. At that time, the angular velocity becomes $\omega$ by impulse $\Delta p1$ of the impact of a ball hit a point P apart from the revolution center axis (Q) by a gap r. At that time, impulse at the grip center Q is $\Delta p2$ where an impulse is the product of a size of force and a time of force and shows how momentum of another object is changed. The velocity at the center of gravity G of the racket is $LG\omega o$ before the ball hits and is $LG\omega$ after the ball hit. A direction of the impact caused by the ball hit is orthogonal to the face and is opposite to the moment direction of the racket. That is, the following is derived.

$$MLG\omega - MLG\omega o = (-\Delta p1) + (-\Delta p2)$$

Although the middle formula is omitted, impulse $\Delta p2$ at the grip center Q becomes zero when $r = (IG/MLG) + LG$ is satisfied. If the impulse $\Delta p2$ is zero, the impact of ball hit does not transmit to the grip center. That is, a point P at a gap r where impulse $\Delta p2$ becomes zero is determined as a sweet spot (point of impact) of the racket.

That is, when a weight M of the mockup (tennis racket), gap LG between the grip center Q and the center of gravity G, and moment of inertia IG of the gravity G are acquired, the sweet spot P of the mockup is acquired. If the sweet spot P of the mockup matches the actual product, an actual use of the actual product can be demonstrated by the mockup.

FIG. 10 shows a mockup (baseball bat) to be formed. A baseball bat has a center of gravity and a sweet spot (point of impact) as in the tennis racket and they can be considered in the mockup.

Figure 11:
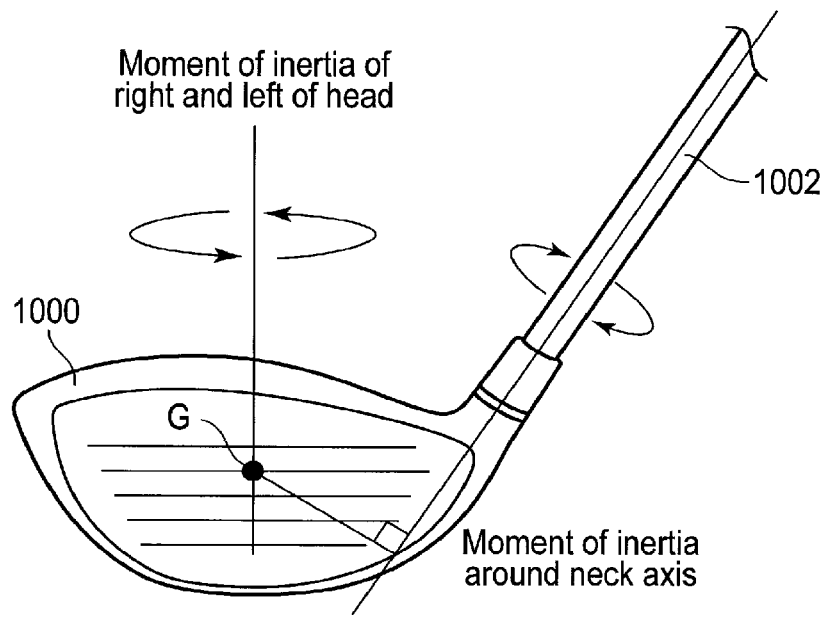
FIG. 11 shows a center of gravity and a moment of inertia of a mockup (a golf driver head) to be formed.
Figure 12:
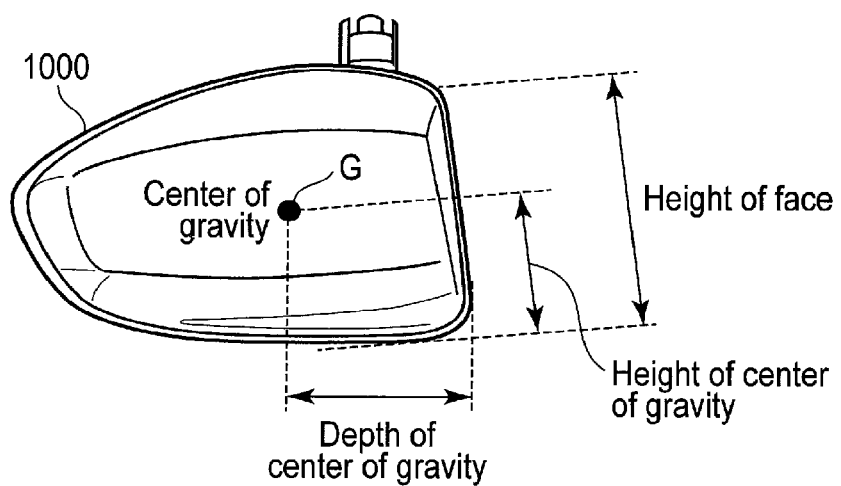
FIG. 12 shows a height of center of gravity and a depth of center of gravity of the mockup (a golf driver head) to be formed.
Figure 15:
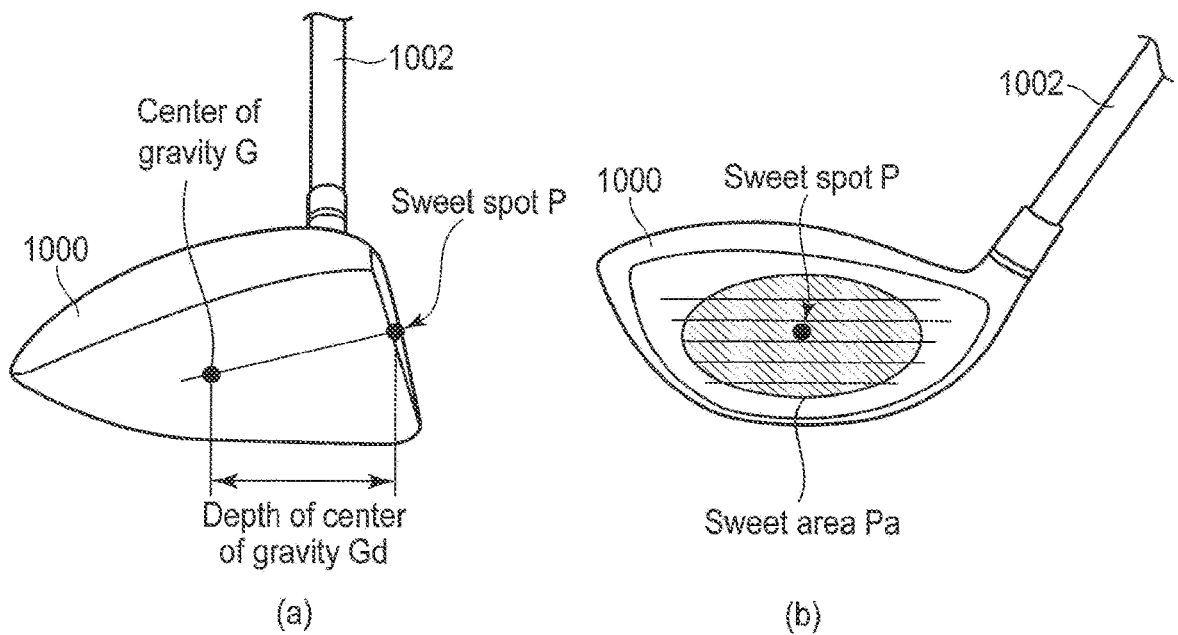
FIG. 15 shows a depth of center of gravity and sweet spot of the mockup (a golf driver head) to be formed.
Figure 16:
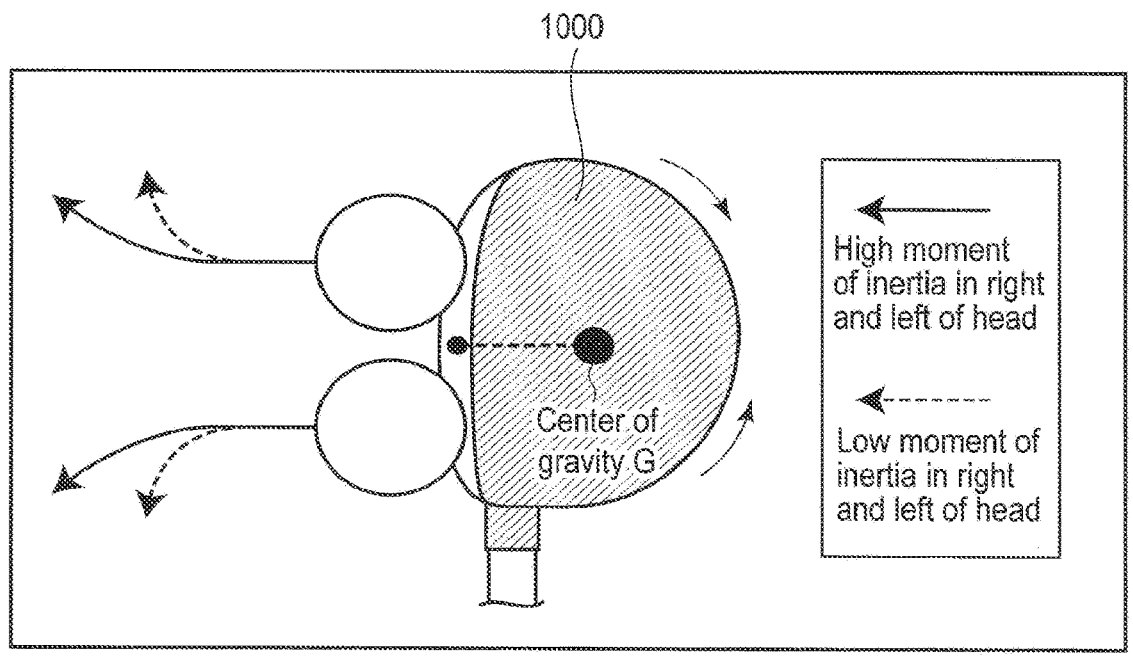
FIG. 16 shows how the height of a moment of inertia in the right and left around a neck axis of the head may effect ballistics of a golf ball in the mockup (golf driver) to be formed.
Figure 17:
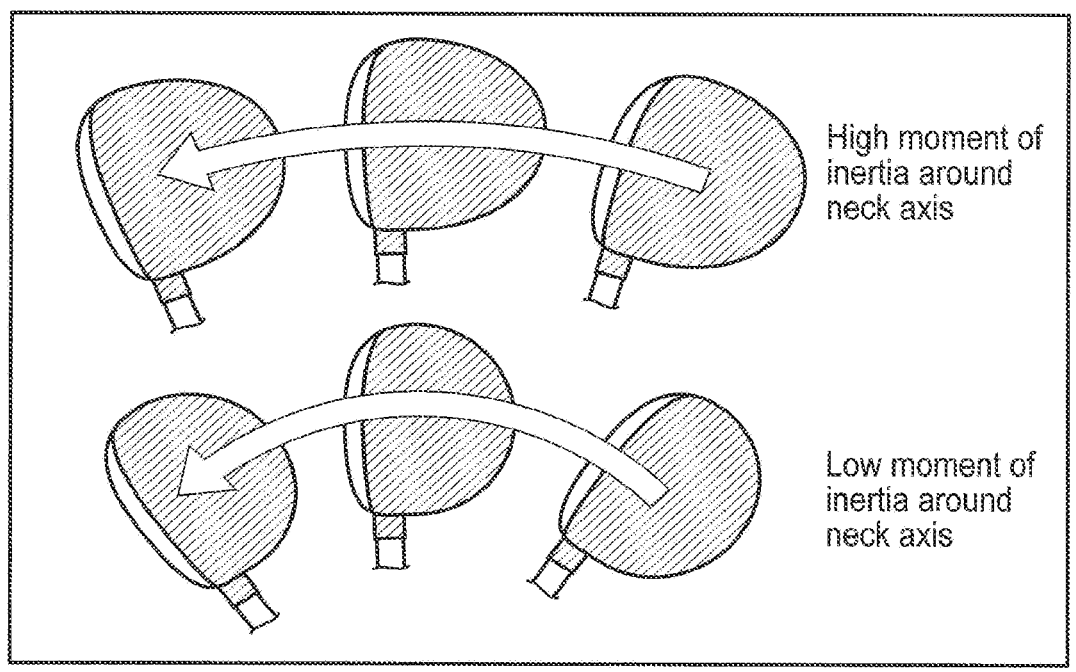
FIG. 17 shows how the height of a moment of inertia around the neck axis of the head may effect a direction of a driver face in the mockup (golf driver) to be formed.
Figure 18:
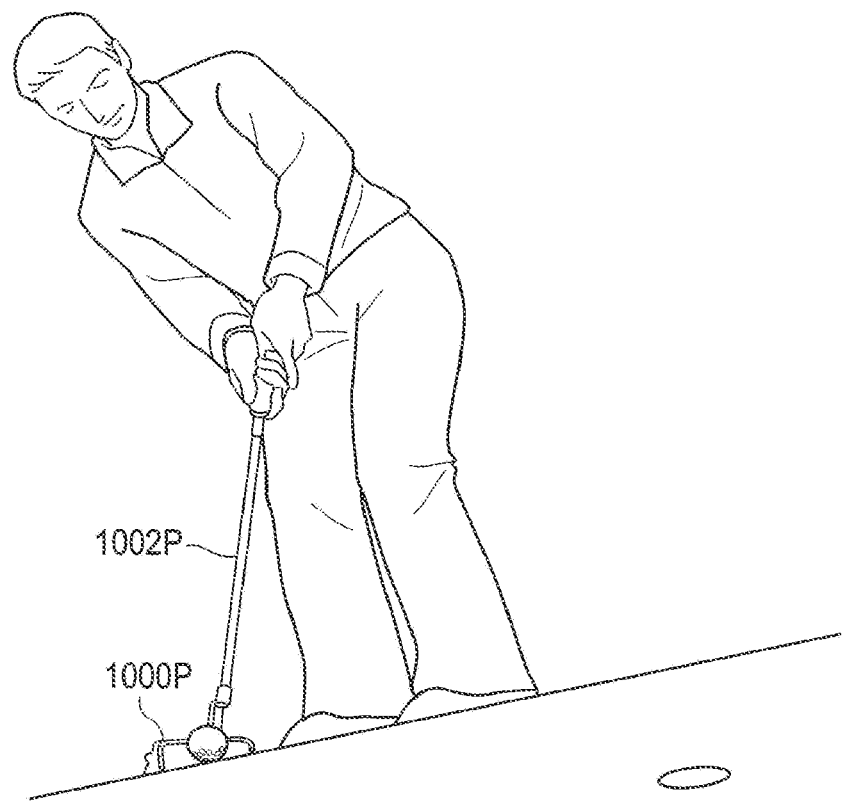
FIG. 18 shows how a mockup (a golf putter) to be formed may be moved (how a user using the mockup feels not only by a weight and a center of gravity but also by a moment of inertia corresponding to a movement of the mockup).

FIG. 11 shows a center of gravity and a moment of inertia of a mockup (a golf driver head) to be formed. FIG. 12 shows a height of center of gravity and a depth of center of gravity of the mockup (a golf driver head) to be formed. FIG. 13 shows a mockup in which the driver head of FIG. 12 is attached to a swing shaft. FIG. 14 shows a relationship between a depth of center of gravity and a moment of inertia in the mockup (a golf driver) to be formed. FIG. 15 shows a depth of center of gravity and sweet spot of the mockup (a golf driver head) to be formed. FIG. 16 shows how the height of a moment of inertia in the right and left around a neck axis of the head may effect ballistics of a golf ball in the mockup (golf driver) to be formed. FIG. 17 shows how the height of a moment of inertia around the neck axis of the head may effect a direction of a driver face in the mockup (golf driver) to be formed.

A mockup of a golf club includes a head 1000 and a shaft 1002 which are formed separately and the weight and center of gravity G of each component can be used as check items. Furthermore, if a mockup corresponding to a finished product of driver is formed by assembling the head 1000 and the shaft 1002 (FIG. 13), sweet spot P or sweet area Pa containing the sweet spot (a hit area which can achieve a well-driven driver shot as substantially with the sweet spot P) can be considered (FIG. 15).

Unlike the tennis racket and the baseball bat, the mockup of the golf driver may include a depth of center of gravity from a hit surface (face) to the center of gravity G (FIGS. 12 and 15(*a*)) as a check item. A relatively high relative relationship is between the moment of inertia and the depth of center of gravity (FIG. 14). Thus, if the position of the depth of the center of gravity of the mockup head to which the sinker is attached (the position of the marker to which the sinker is attached) is made adjustable, the moment of inertia of the head can be considered in the mockup.

Here, the reason why the moment of inertia of the golf driver head is important will be briefly explained. If the moment of inertia in the right and left sides of the head 1000 (FIG. 11) is low, the head tends to rotate when the golf ball is hit at a position slightly shifted from the axis of center of gravity, and the ball fries to further bend outward or inward of the vertical surface direction of the face of the head 1000 (as in dotted arrows). If the moment of inertia in the right and left sides of the head 1000 (FIG. 11) is high, the head is difficult to rotate when the golf ball is hit at a position slightly shifted from the axis of center of gravity, and the ball fries with less bending (solid arrows in FIG. 16).

Furthermore, if the moment of inertia around a neck axis of the driver (FIG. 11) is high, an angle change of the face surface when the driver is swung becomes relatively small (the upper part of FIG. 17); however, if the moment of inertia around a neck axis of the driver (FIG. 11) is low, an angle change of the face surface when the driver is swung becomes great (the lower part of FIG. 17), and the drive direction of the ball is difficult to be stabilized.

The above case is related to the driver which is greatly swung in its use; however, even with a putter which is not significantly moved in its use, consideration of position of center of gravity and moment of inertia (and sweet spot) in the mockup including an assemble of putter head 1000P and putter shaft 1002P is desirable.

As can be understood from the above, a product movement (swing) of which is important requires consideration of moment of inertia in the mockup.

<Points of Embodiment>

The technique of the embodiment adopts a scheme to minimize a different of weight between a solid object to be formed and an actual product by attaching a sinker (which is detachably attached and movable) to the solid object. Thus, the shape of the solid object and the difference of weight between the solid object and the actual product are not limited, and thus, the technique is applicable to any type of mockup.

In the mockup automatic weight adjustment system of the embodiment forms a solid object of the mockup and attaches a sinker thereto such that the mockup has a weight and a center of gravity which are equal to those of the actual product in the check of the shape. Thus, by actually handling the mockup, the weight can be confirmed and the look can be compared to a past product for a similarity check. Furthermore, since the center of gravity matches, the weight balance can be checked, and thus, weight reduction and balance improvement can be considered in an early stage of the development.

If the center of gravity of the mockup is biased and the balance is poor, the sinkers may be arranged manually to improve the balance. At that time, the positions of center of gravity which are easily recognized by the markers and the inference check between the sinkers and structural components of the mockup are performed properly.

Furthermore, in the embodiment where the moment of inertia and sweet spot are all considered, the consideration of how mobile products such as a tennis racket and a golf club are felt in their use is performable.

<Notes Corresponding to Originally Attached Claim>

[1] A stereolithography apparatus (33: 3D printer of various kinds) which forms a solid object on the basis of original design data (CAD data of STL file format or the like), the apparatus provides one or more markers corresponding to one or more sinkers disposed in one or more positions (MK, MKa, MKb1 to MKb4) of an object which is formed to be lighter than a design weight of the solid object formed on the basis of the original design data.

[2] The apparatus of [1], wherein the marker is disposed to prevent at least a part of one or more sinkers from interfering with a structural component of the solid object formed on the basis of the original design data (such that, when a mockup of a clamshell PC is closed, a lid does not hit a sinker disposed in the body of the object), and/or the marker is disposed to prevent at least a part of one or more sinkers from interfering with a design of the solid object formed on the basis of the original design data (such that a sinker does not partly project on an outer side surface of a clamshell PC and the design of the clamshell PC is not affected).

[3] The apparatus of [1], wherein the weight of the object is optionally increased with the one or more sinkers.

[4] The apparatus of [1], wherein a shape, size, and weight of the one or more sinkers are determined to set a difference between the design weight and an estimated weight of the solid object estimated from a material (a resin or a metal) of the solid object formed on the basis of the original design data within a certain range (for example, the difference between the design weight and the estimated weight is ±10 to 20%, which can be set optionally).

[5] The apparatus of [1] to [4], wherein a center of gravity of the solid object including one or more sinkers disposed in the positions of the one or more markers is disposed to match or to come as close as possible to a center of gravity of the solid object formed on the basis of original design data.

[6] The apparatus of [5], wherein, if the solid object on the basis of the original design data includes a space (for example, a ring frame of a tennis racket) and the center of gravity of the solid object is within the space, the markers are disposed in a plurality of positions in the solid object avoiding the space.

[7] The apparatus of [5], wherein, if the solid object on the basis of the original design data corresponds to a mockup of a mobile product (an actual-size mockup of a tennis racket, golf club, or baseball bat), the moment of inertia (where the moment of inertia in the center of gravity is IG, and the weight of the mockup is M, the moment of inertia Io in a position distant from the center of gravity by d is expressed as $Io=IG+Md^2$) estimated when a virtual user moves the mockup matches or comes as close as possible to the moment of inertia of the solid object formed on the basis of the original design data.

[8] The apparatus of any one of [1] to [7], wherein, if the solid object on the basis of the original design data corresponds to a mockup of a product with a sweet spot (an actual-size mockup of a tennis racket, golf club, or baseball bat), the sweet spot (point of impact) of the mockup matches or comes as close as possible to the sweet spot of the solid object formed on the basis of the original design data.

[9] A stereolithography method comprising forming a solid object on the basis of the original design data (CAD data of STL file format or the like), wherein an object (mockup) is formed lighter than a design weight of the solid object formed on the basis of the original design data (ST16), and one or more markers corresponding to one or more sinkers disposed in one or more positions in the object (ST20, ST44).

In addition to the embodiments described above, a combination of the above embodiments can be adopted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying Claims and their equivalents are intended to cover such forms or modifications as would fall within the scope and spirit of the inventions.

What is claimed is:

1. A stereolithography apparatus which forms a solid object on the basis of original design data, the apparatus comprising;
   one or more markers corresponding to one or more sinkers disposed in one or more positions of a mockup which is formed to be lighter than a design weight of the solid object formed on the basis of the original design data;
   a system main body comprising a center of gravity calculation processor configured to calculate a center of gravity of the mockup to be formed;
   an input device connected to the system main body, and including a display which displays an image of the mockup;
   wherein the center of gravity calculation processor is configured to calculate the center of gravity of the solid object based on the addition of the one or more sinkers adding weights at the positions of the one or more markers to match or to come as close as possible to the center of gravity of the solid object formed on the basis of original design data,
   wherein the marker is disposed to prevent at least a part of the one or more sinkers from interfering with a structural component of the solid object formed on the basis of the original design data, and/or
   the marker is disposed to prevent at least a part of the one or more sinkers from interfering with a design of the solid object formed on the basis of the original design data, and
   if the solid object on the basis of the original design data includes a hollow where no sinker is allowed and the center of gravity of the solid object is within the hollow, the markers are disposed in a plurality of positions of the solid object avoiding the hollow, and keep the center of gravity, the positions of the markers are shown on the image of the mockup on the display, and a distributed placement position of the markers is adjustable during designing of the solid object.

2. The apparatus of claim 1, wherein the weight of the object is optionally increased with the one or more sinkers.

3. The apparatus of claim 1, wherein a shape, size, and weight of the one or more sinkers are determined to set a difference between the design weight and an estimated weight of the solid object estimated from a material of the solid object formed on the basis of the original design data within a certain range.

4. The apparatus of claim 1, wherein, if the solid object on the basis of the original design data corresponds to a mockup of a mobile product, the moment of inertia estimated when a virtual user moves the mockup matches or comes as close as possible to the moment of inertia of the solid object formed on the basis of the original design data.

5. The apparatus claim 1, wherein the center of gravity calculation processor further comprises a moment of inertia calculation processor configured to calculate the moment of inertia of the mockup to be formed.

6. The apparatus of claim 1, wherein, if the solid object on the basis of the original design data corresponds to a mockup of a product with a sweet spot, the sweet spot of the mockup matches or comes as close as possible to the sweet spot of the solid object formed on the basis of the original design data.

7. The apparatus of claim 1, wherein, if the solid object on the basis of the original design data corresponds to a mockup of a product with a sweet spot, the sweet spot of the mockup matches or comes as close as possible to the sweet spot of the solid object formed on the basis of the original design data.

8. The apparatus of claim 2, wherein, if the solid object on the basis of the original design data corresponds to a mockup of a product with a sweet spot, the sweet spot of the mockup matches or comes as close as possible to the sweet spot of the solid object formed on the basis of the original design data.

9. The apparatus of claim 5, wherein, if the solid object on the basis of the original design data corresponds to a mockup of a mobile product, the moment of inertia estimated when a virtual user moves the mockup matches or comes as close as possible to the moment of inertia of the solid object formed on the basis of the original design data.

* * * * *